(No Model.)
J. M. & S. B. MOODY.
CRANBERRY GATHERER.
No. 522,379.  Patented July 3, 1894.
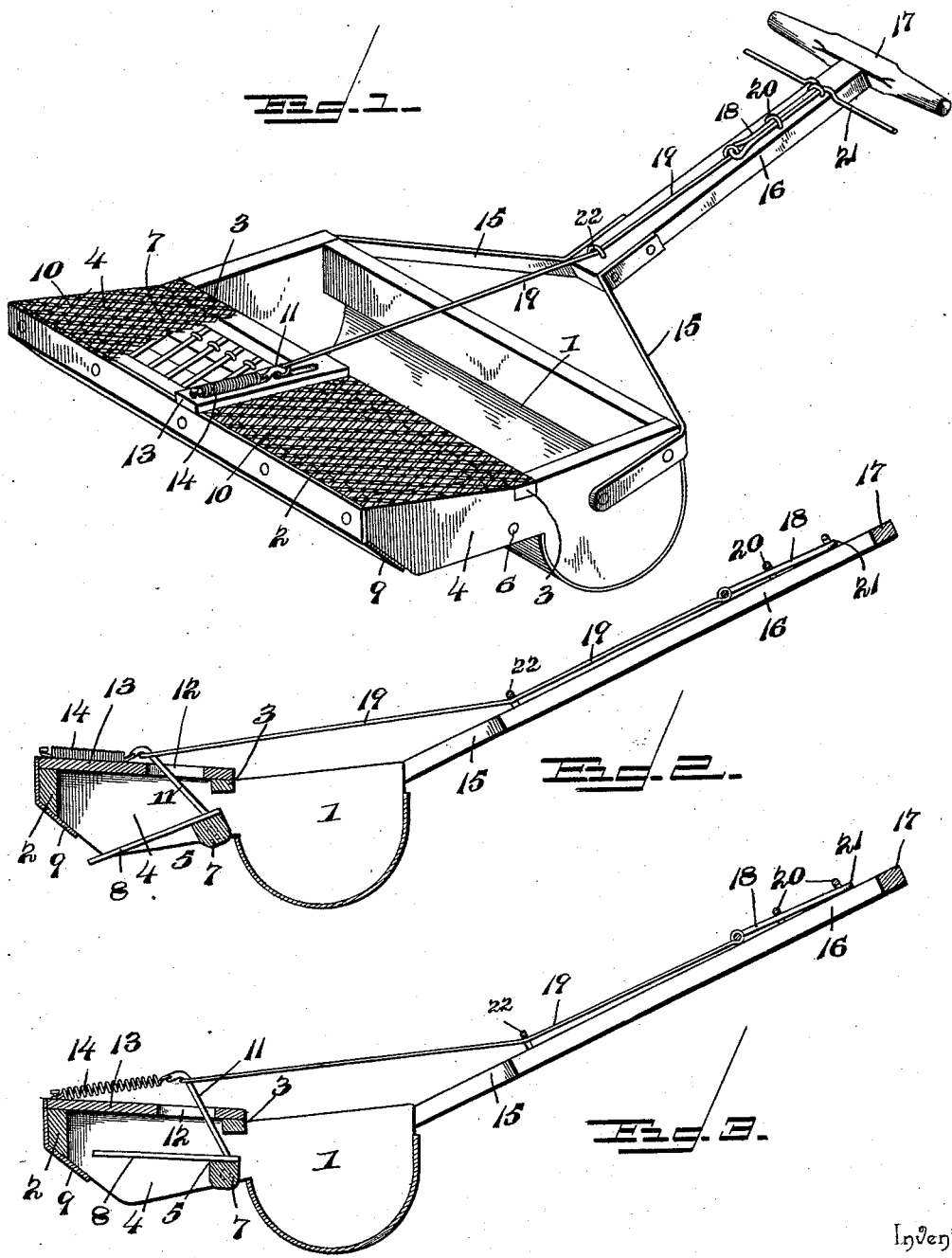
Witnesses
E. H. Stewart
Inventors
James M. Moody
Sidney B. Moody
By their Attorneys.

UNITED STATES PATENT OFFICE.

JAMES M. MOODY AND SIDNEY B. MOODY, OF HARWICH, MASSACHUSETTS; SAID JAMES M. MOODY ASSIGNOR TO SAID SIDNEY B. MOODY.

CRANBERRY-GATHERER.

SPECIFICATION forming part of Letters Patent No. 522,379, dated July 3, 1894.

Application filed March 22, 1894. Serial No. 504,717. (No model.)

*To all whom it may concern:*

Be it known that we, JAMES M. MOODY and SIDNEY B. MOODY, citizens of the United States, residing at Harwich, in the county of Barnstable and State of Massachusetts, have invented a new and useful Cranberry-Gatherer, of which the following is a specification.

Our invention relates to berry picking or gathering devices, and particularly to an apparatus for gathering cranberries, the objects in view being to provide a simple and efficient device adapted to be pushed over cranberry vines in advance of the operator and having a detaching fork and an adjacent receptacle, whereby as the berries are detached from the vines they are caused to pass without further manipulation into the receptacle.

Further objects and advantages of the invention will appear in the following description, and the novel features thereof will be particularly pointed out in the claims.

In the drawings:—Figure 1 is a perspective view of an apparatus embodying our invention arranged in the operative position. Fig. 2 is a central longitudinal section of the same showing the fork in its depressed position, as when the device is being engaged with the vines. Fig. 3 is a similar view showing the fork elevated and in operative position with the inclined flange at the front end of the device as seen after the engagement of the fork with the vines and when the apparatus is being drawn to the rear to detach the berries.

Similar numerals of reference indicate corresponding parts in all the figures of the drawings.

1 designates a receptacle in the form of a transversely disposed trough, the sides of which are extended forward to form an approximately horizontal frame in connection with the front bar 2 and the transverse strip 3, which is arranged parallel with said front bar. Fulcrumed in the side pieces 4 of the frame thus formed is the fork 5, which is disposed below the plane of the transverse strip 3 and is spaced therefrom a sufficient distance to allow berries after detachment to roll rearwardly into the receptacle. The trunnions 6, which are attached to the extremities of the roller-bar 7 forming a part of said fork, are mounted in bearings in the side pieces, and the fingers 8 of said fork are secured to the upper side of said roller bar.

Attached to the front of the frame and extending downward and rearward is a detaching flange 9, which terminates adjacent to the free front extremities of the fingers of the fork, whereby when the fork is elevated to the position shown in Fig. 3 the ends of its fingers are arranged contiguous to the free edge of the detaching flange. The upper side of the frame above the fork is covered by netting 10 or any other similar material to prevent the berries detached from the vines from being thrown out of the frame, said covering being secured to the upper edges of the side pieces of the frame and the upper edges of the front bar 2 and transverse strip 3.

Secured to the roller bar of the fork is an arm 11, which extends upward through a slot 12 formed in a bar 13 connecting the centers of the front bar 2 and transverse strip 3, and connected to the upper extremity of this arm is a coiled actuating spring 14, whereby the fork is normally held in the position shown in Fig. 2, in which the fingers thereof are depressed below the plane of the rear edge of the detaching flange.

Secured to the receptacle by means of a yoke 15 is a handle 16 provided at its rear end with a cross-bar 17, and mounted upon the handle adjacent to the cross-bar is an operating slide 18 connected by means of a wire or other flexible connection 19 with the upper end of the arm 11, whereby when the slide is drawn to the rear or toward the cross-bar of the handle the fork is operated and the fingers thereof are elevated to the position shown in Fig. 3. Said slide is mounted in the guiding keepers 20, and is provided at its rear end with the lateral extensions 21, which are disposed parallel with the cross-bar of the handle within reach of the fingers of the operator. An intermediate portion of the wire or flexible connection 19 passes through a keeper 22 located near the front end of the handle.

The operation of the apparatus is as follows:—The rounded bottom of the receptacle, which extends below the plane of the forwardly extending frame and is preferably provided with a rounded sheet metal cover or sheath, is adapted to rest upon and be pushed over the vines in advance of the operator. During this forward movement of the apparatus the fork is allowed to remain in its depressed position, as shown in Fig. 2, until the fingers thereof have engaged with a number of the berry bearing tops of the vines. The operator now elevates the fork by drawing rearwardly upon the slide mounted upon the handle, after which the apparatus is drawn to the rear to cause the detachment of the berries, and the latter, which are left upon the upper side of the fork, are caused to roll to the rear and into the receptacle by slight inclination produced by depression of the rear end of the handle.

The rounded lower surface of the receptacle forms a suitable bearing and fulcrum for the apparatus, whereby it may be arranged at the desired inclination and moved either forward or rearward without unnecessary friction, but if preferred, bearing rolls of any suitable construction may be arranged at the bottom of the receptacle to travel over the vines or the surface of the ground.

Various changes in the form, proportion, and the minor details of construction may be resorted to without departing from the spirit of the invention or sacrificing any of the advantages thereof.

Having described our invention, what we claim is—

1. A berry-gathering apparatus having a receptacle, in combination with the berry-gathering devices consisting of a fixed flange, a rocking fork having its fingers terminating adjacent to the said flange, an actuating spring adapted to normally hold the fingers of the fork below the plane of said flange, and means under control of the operator for elevating the fingers of the fork to the plane of the flange, substantially as specified.

2. In a berry-gathering apparatus, the combination with a receptacle, and a frame arranged in advance thereof, of a detaching flange arranged at the front of said frame and inclined downwardly and rearwardly toward its free edge, a fork having a roller-bar journaled in bearings in the sides of said frame and having fingers which terminate adjacent to the free edge of said flange, a shield or cover arranged over said frame, and means for operating the fork, substantially as specified.

3. In a berry-gathering apparatus, the combination with a receptacle, of a fork having a roller-bar fulcrumed at the front edge of said receptacle with its upper sides slightly above the plane of said front edge of the receptacle, a fixed flange arranged adjacent to the free terminals of the fingers of the fork, a shield or cover arranged above the plane of the fork, and means for operating the fork, substantially as specified.

4. In a berry-gathering apparatus, the combination with a receptacle provided with a rounded bearing surface, of a rocking-fork, a detaching flange arranged adjacent to the terminals of the fingers of said fork, an arm connected to the fork, an actuating spring to normally hold the fork with its fingers arranged below the plane of said detaching flange, and a slide mounted upon the handle of the receptacle and flexibly connected with the arm of the fork, substantially as specified.

In testimony that we claim the foregoing as our own we have hereto affixed our signatures in the presence of two witnesses.

JAMES M. MOODY.
SIDNEY B. MOODY.

Witnesses:
SULLIVAN W. ROGERS,
ALPHONSO L. WEEKES.